United States Patent [19]

Hara et al.

[11] Patent Number: 4,926,604
[45] Date of Patent: May 22, 1990

[54] METHOD FOR CORRECTING ABRASION IN A ROBOT HAVING A WEARING TOOL MOUNTED THEREON

[75] Inventors: Masaaki Hara; Seigo Nishikawa; Taketoshi Tazaki; Hiroshi Inokuchi, all of Kitakyushu, Japan

[73] Assignee: Kabushiki Kaisha Yaskawa Denki Seisakusho, Fukuoka, Japan

[21] Appl. No.: 291,300

[22] Filed: Dec. 28, 1988

[30] Foreign Application Priority Data

Dec. 28, 1987 [JP] Japan ............................. 62-329719

[51] Int. Cl.$^5$ .............................................. B24B 49/00
[52] U.S. Cl. ............................... 51/165.88; 51/165.77; 51/99; 15/21 E; 901/41
[58] Field of Search .......... 51/105 EC, 100 R, 165 R, 51/165.71, 165.77, 165.88, 165.87, 281 R, 35, 99; 901/9, 41, 46; 15/21 E

[56] References Cited

U.S. PATENT DOCUMENTS

| | | | |
|---|---|---|---|
| 3,691,698 | 9/1972 | Schaller | 51/165.88 |
| 4,571,892 | 2/1986 | Brill | 51/165.88 X |
| 4,603,511 | 8/1986 | Komatsu et al. | 901/41 X |
| 4,667,443 | 5/1987 | Sakurai et al. | 51/105 EC X |
| 4,753,044 | 6/1988 | Bula | 51/165.87 X |
| 4,756,124 | 7/1988 | Rossi et al. | 51/105 EC X |

FOREIGN PATENT DOCUMENTS 69894  6/1979  Japan ................................. 51/165.87

*Primary Examiner*—Robert P. Olszewski
*Attorney, Agent, or Firm*—Wenderoth, Lind & Ponack

[57] ABSTRACT

Burring by way of a grind stone using a robot has been rarely practiced because the correction of abrasion of the grind stone involves a problem. There has been hitherto proposed a method for correction of abrasion by making use of a force sensor or a special tool holder apparatus. However, since the apparatus is expensive and low in reliability, it has not been practical. In the present invention, a coordinate system is set to a wearing tool mounted to a wrist of a robot separately from the rectangular coordinates of the robot, and the worn amount of the tool detected by use of a sensor is subjected to parallel shifting on the coordinate system of the tool set to the tool to effect correction of abrasion, which is characterized in that a special hard is not required, and operation is simple.

4 Claims, 6 Drawing Sheets

$$\begin{cases} \Delta x = D\cos\theta \\ \Delta y = D\sin\theta \end{cases}$$

METHOD FOR CORRECTING ABRASION IN A ROBOT HAVING A WEARING TOOL MOUNTED THEREON

BACKGROUND OF THE INVENTION AND PRIOR ART

The present invention relates to the correction of abrasion in the case where a wearing tool such as a grind stone, a buff, a wire brush and the like is used for a robot.

In the case where a robot is used to carry out a burring work, when a grind stone is used as a tool, the grind stone gradually becomes worn out to reduce its diameter. It is therefore necessary to correct the reduced portion of the diameter by some kind of methods.

In an automatic machine which merely moves in a linear fashion, a reduced portion of the diameter is measured by a sensor, and the grind stone is parallel-moved in one direction by the amount measured whereby the correction of the worn amount may be corrected.

However, in the apparatus which involves complicated movements in a three-dimensional fashion such as a robot, the correction of the diameter cannot be carried out merely by parallel-moving the grind stone in one direction on an absolute coordinate on a normal robot control point.

Therefore, methods described below have been hitherto used to correct the abrasion.

(1) Method utilizing a force sensor

When a grind stone becomes worn out, a pressing pressure to work varies. a position of a robot is adjusted while detecting a pressing pressure by use of a force sensor so that the pressing pressure to the work is constant, whereby correction of abrasion of the grind stone is effected.

(2) Method for attaching a tool holder capable of sliding a wearing tool to a wrist of a robot A tool holder capable of sliding a grind stone is attached to a robot wrist, and the worn amount is detected by a sensor, after which the amount is slidably moved.

Then, a robot is operated so that the slid direction is always at a given angle with respect to a work surface, whereby correction of abrasion of the grind stone is effected.

Alternatively, there is a method, to which the aforementioned method is applied, for mounting a device disclosed in Japanese Patent Application Laid-Open No. 9862/1987 to a robot wrist.

(3) Method in which the worn amount of a tool is calculated by position detection and storage function of a robot, and the worn portion is shifted on rectangular coordinates of the robot (the absolute coordinates set to the robot body).

In this method, as disclosed in Japanese Utility Model Application Laid-Open No. 187905/1985 and Japanese Patent Application Laid-Open No. 188095/1986, a wearing work tool is provided on a wrist portion of a robot and an on-off type sensor is provided externally to detect the worn amount of the tool. The robot causes the wearing work tool in a predetermined direction from a reference position toward the sensor, the present position of the robot when the sensor is turned on is stored, the worn amount of the wearing work tool is calculated from a difference between the reference position and the present position when the sensor is turned on, and the worn amount of the work tool is parallel-shited in one direction on the rectangular coordinates of the robot (the absolute coordinates set to the robot body) whereby correction of abrasion of the tool is effected.

While the above-described method disclosed in Utility Model Application Laid-Open No. 187905/1985 and Japanese Patent Application Laid-Open No. 188095/1986 is effective in the method for decting the worn amount of the work tool, there is a problem in the abrasion correction method itself.

More specifically, let a be the work tool prior to abrasion and let b be the work tool after abrasion, if work is a flat work W (a material to be cut) on a plane of rectangular coordinates H of a robot (the absolute coordinates set to the robot body), the method is recognized to be effective. However, for those in which the work surface varies in a three-dimensional fashion or with respect to the operation on the circumference, the robot empolying the above-described method of correction cannot be applied since the correction method is one direction of the rectangular coordinates H of the robot. That is, in the case where a polygonal Work W' is cut by a circular work tool (for example, such as a grind stone) as shown in FIG. 2, a robot locus after abrasion has been corrected (after shifting) becomes deviated, posing a problem in that the work tool does not contact with the work W', rendering the operation itself impossible.

In FIG. 2, S is the worn amount (which is equal to the shifted amount), and arrow f is the shifting direction.

Furthermore, the aforementioned method using a force sensor involves the problem in that the sensor itself is expensive, the problem of delay in response of a sensor, and the problem in reliability in adverse environment in burring. Moreover, in the aforementioned method in which a slide device is mounted, the wrist portion becomes large, the apparatus which can withstand high loads and shocks and which accurately performs locating is expensive and there involves a problem in reliability in the adverse environment.

SUMMARY OF THE INVENTION

The present invention has been achieved in view of the fact that since the conventional method is high in cost and complicated, the burring operation using a grind stone, a buff, a wire brush or the like is merely accomplished accomplished with low reliability despite the demand for accomplishment of the operation at less cost because the additional value is essentially difficult to bring forth. It is an object of the present invention to provide a method for simply and positively carrying out correction of abrasion of a tool in burring operation by a robot.

For achieving the aforesaid object, according to the present invention, a photo-electric tube or an on-off type sensor is provided externally of a robot, whereby a tool prior to abrasion (a tool before being used) mounted to a robot wrist is detected by the sensor, the present position of the robot when the sensor is turned on (or off) is stored, a tool after abrasion is likewise detected by the sensor to detect the present position of the robot, and a difference between the present positions of the robot in the tools prior to and after abrasion is calculated as the worn amount.

As for the abrasion correcting method (shift method), separately from the rectangular coordinates of robot (the absolute coordinate system of robot), the coordinate system (tool coordinate) is set to a wearing tool mounted to a robot wrist, the worn amount of the tool detected by the above-described method is parallel-shifted in the coordinate system set to the tool wherby correction of abrasion of the tool is effected.

DESCRIPTION OF THE PREFERRED EMBODIMENTS

Figure 1:
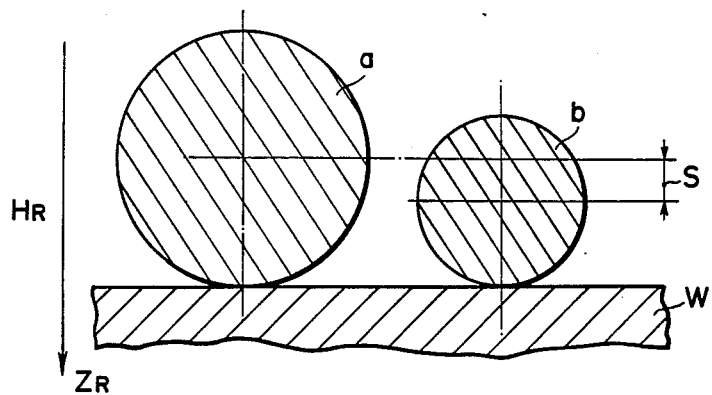
FIG. 1 is an explanatory view of a conventional abrasion-correction method for which object is a flat work.
Figure 2:
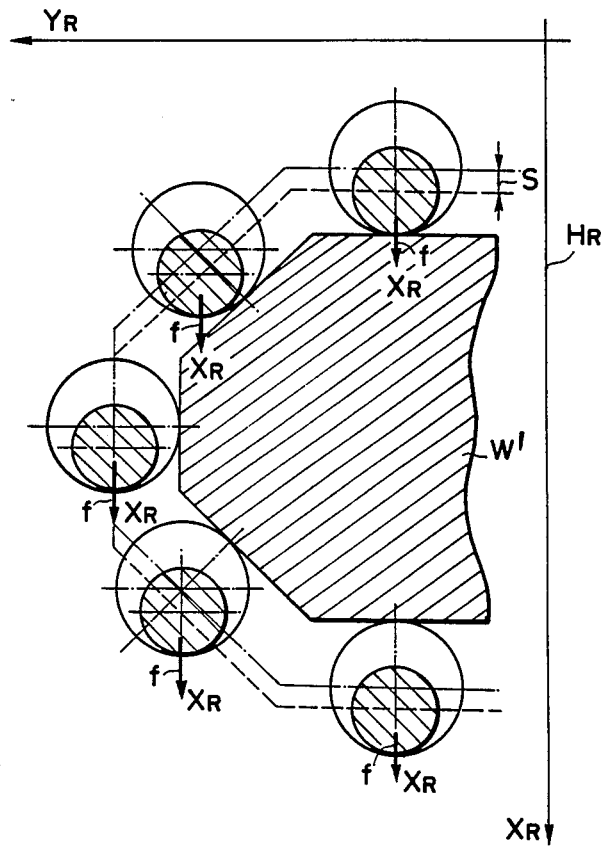
FIG. 2 is an explanatory view in the case where a solid surface is ground by the conventional abrasion-correction method.
Figure 3:
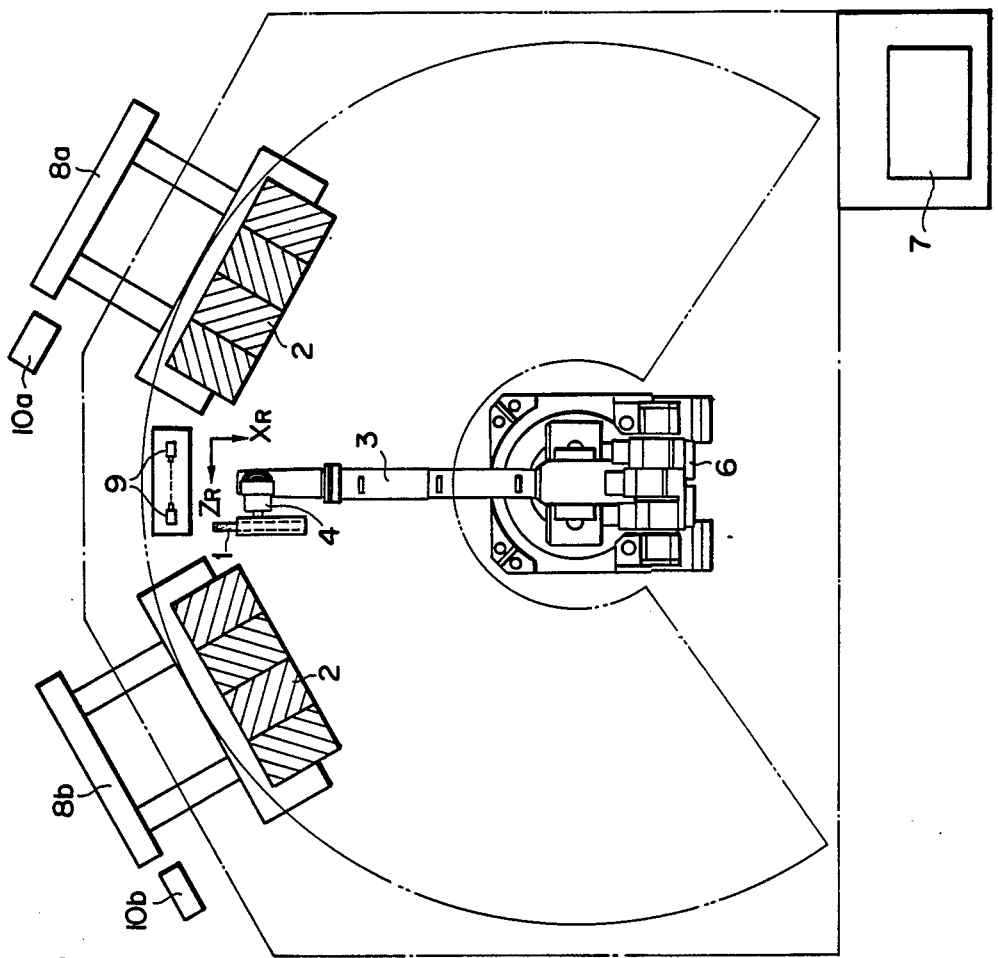
FIG. 3 is a plan view of a burring apparatus by way of a robot using a grind stone which is an embodiment to which the present invention is applied.

FIG. 3 shows a burring apparatus using a robot 6. reference numeral 7 designates a robot controller; 8a, 8b, carrier devices with a work W mounted thereto; 9, a sensor using a photo-electric tube; and 10a, 10b, operation boxes for starting and stopping.

In this burring apparatus, the work carrier devices 8a and 8b are secured to left and right sides, respectively, of the robot 6, and the burring operation for works 2 is alternately carried out by a grind stone 1 of the robot. That is, during the burring of one work, the other work is removed from or mounted to the work carrier device.

Figure 4:
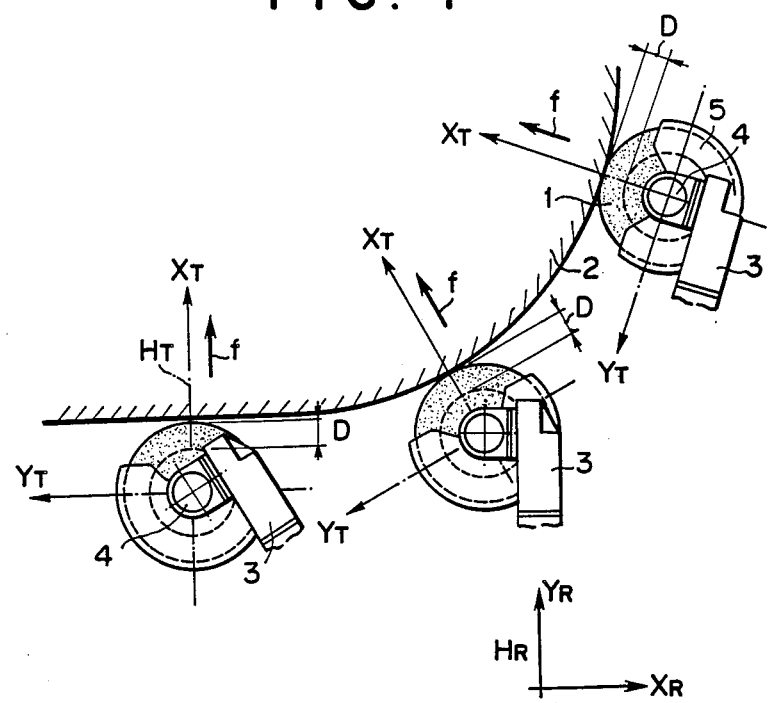
FIG. 4 is a side view showing the relationship between the grind stone in the embodiment of the present invention and the shifting direction for correction.

FIG. 4 shows the state of the burring operation by use of the grind stone 1 on the robot. When the grind stone 1 is worn out as indicated by the broken line, the work 2 cannot contact therewith and therefore must be shifted in the direction as indicated by the arrow f.

Figure 5:
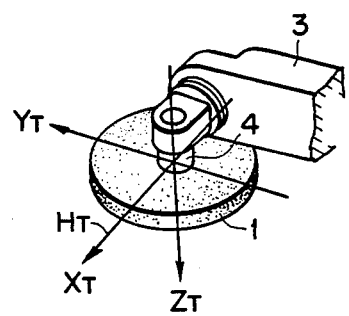
FIG. 5 is an explanatory view of an example of coordinates set to a tool mounted to a robot wrist.

In the embodiment of the present invention, for effecting said shifting, the coordinate system $H_T$ is first set to the grind stone 1 mounted to the robot wrist 3 as shown in FIG. 5.

Figure 6:
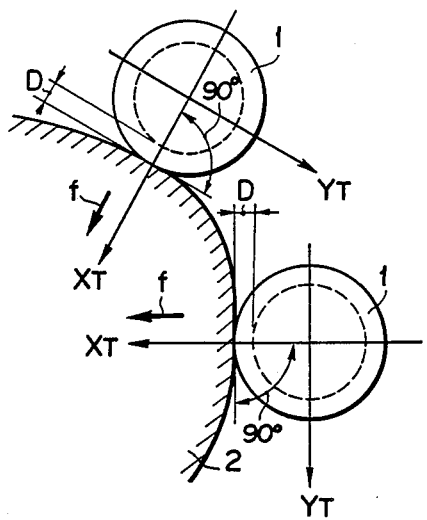
FIG. 6 is an explanatory view showing a teaching example of burring.

Next, the robot 6 is subjected to teaching so that the axis Xr at the coordinate system $H_T$ set to the grind stone 1 is always at a given angle, for example, 90°, with respect to the work 2 as shown in FIG. 6.

In the actual burring operation, the worn amount of the grind stone 1 is measured once a cycle or a few cycles of the burring operation, and shifting is effected at the coordinate system $H_T$ set to the grind stone 1 mounted to the wrist 3 of the robot 6 to correct the worn amount.

The setting of the shift amount S is done first by detecting the diametral worn amount D of the grind stone 1 by the sensor 9 and shifting the amount D (S) at the coordinate system $H_T$ set to the grind stone 1. For the shift amount S, if the axis Xr at the coordinate system $H_T$ set to the grind stone 1 has been subjected to teaching to 90° with respect to the work 2, the grind stone is shifted by the amount D in the + direction of the axis Xr.

Figure 7:
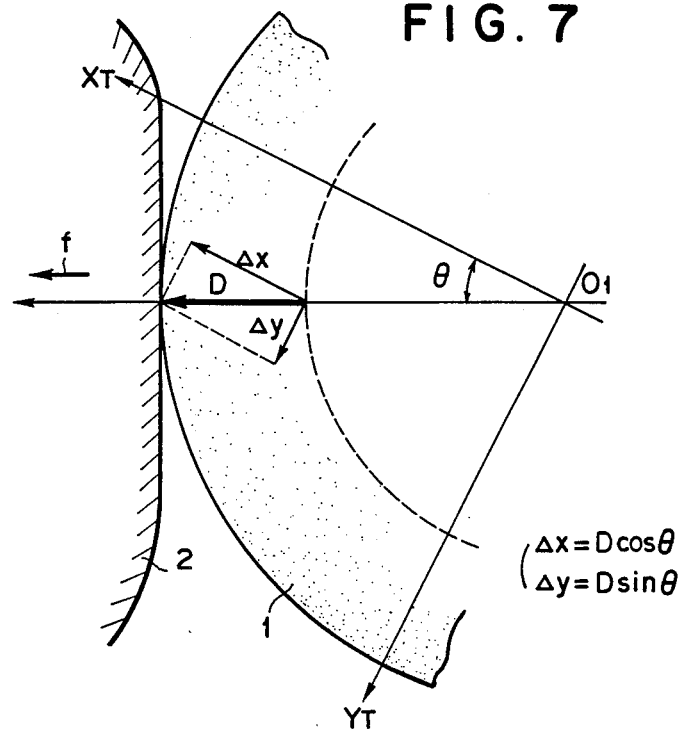
FIG. 7 is an explanatory view of a shifting method in the case where the coordinate set to the tool is different from the position of axis Xr in contact with the work.

If the axis Xr at the coordinate system set to the grind stone 1 has been subjected to teaching at an angle of $\theta$ with respect to the work 2 as shown in FIG. 7, shifting is carried out in the shift amount S of $D \cos\theta$ in the +direction of the axis Xr and $D \sin\theta$ in the + direction of the axis $Y_T$ of the coordinate systems set to the grind stone 1.

The measurement of the shift amount is carried out in the procedure as described below.

That is, in FIG. 3, at the outset of operation, the robot 6 is operated to advance the grind stone 1 prior to abrasion (upward movement in FIG. 3) to detect the grind stone by the sensor 9, the position $X_R$ 1 of the robot when the sensor is turned on is stored, the position $X_R$ 2 of the grind stone 1 after abrasion is likewise detected by the sensor 9, and the difference ($X_R$ 2 - $X_R$ 1) is calculated as the worn amount D.

In the abrasion correction of a tool, separately from the rectangular coordinates $H_R$ of a robot (the absolute coordinate system of a robot), parallel shifting is carried out at the coordinate system $H_T$ of a wearing tool mounted to the robot wrist to effect the abrasion correction of the tool.

Figure 8:
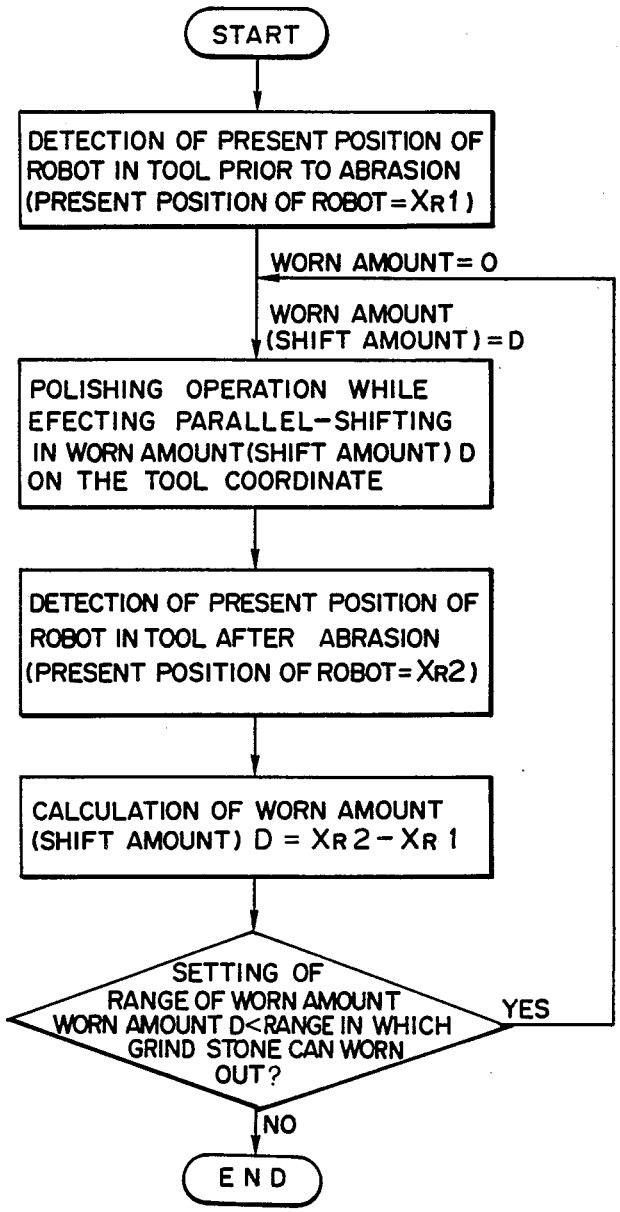
FIG. 8 is a flow chart for correcting abrasion of a tool in the embodiment according to the present invention.

A flow chart of the above-described method for correction of abrasion is as shown in FIG. 8.

Figure 9:
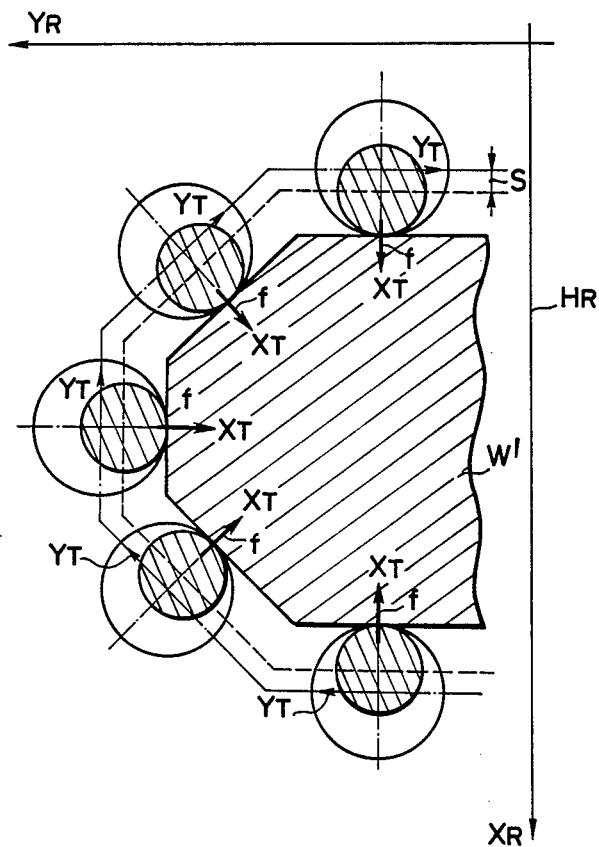
FIG. 9 is an explanatory view showing a locus of a work tool prior to abrasion and a locus of a work tool after abrasion to which the present invention is applied.

As described above, the present invention provides the method in which the worn amount D of the grind stone 1 detected is parallel-shifted at the coordinate system $H_T$ set to the grind stone 1 mounted to the robot wrist 3 to thereby effect the correction. Therefore, in the case where a three-dimensional work W' is deburred by the grind stone 1 as shown in FIG. 9, the grind stone after abrasion, i.e. b is not moved away from but always in contact with the work W' to effect burring. Since the abrasion correction may be carried out without use of the force sensor or special tool, it is possible to effect the burring operation at less cost and with high reliability.

Moreover, since the abrasion correction can be carried out by use of the robot control device, there is the advantage in that handing is simple.

The abrasion correction method according to the present invention is effective not only in the case of using a grind stone but likewise effective, as in the case of the grind stone, even in the robot operation which uses a wearing tool such as a buff, a wire brush or the like.

What is claimed is:

1. A method for correction of abrasion in a robot having a wearing tool mounted thereto, the method comprising setting a coordinate system $H_T$ with respect to a wearing tool mounted to a wrist of a robot separately from a rectangular coordinate system $H_R$ of a robot, providing a sensor externally of the robot, detecting said tool prior to and after abrasion, calculating the worn amount of said tool from a difference between positions of the robot when the sensor is turned on or off, and parallel-shifting the worn amount at the coordinate system set to said tool to effect correction of abrasion.

2. The method for correction of abrasion in a robot having a wearing tool mounted thereto according to claim 1, wherein the wearing tool is a grind stone.

3. The method for correction of abrasion in a robot having a wearing tool mounted thereto according to claim 1, wherein the wearing tool is a buff.

4. The method for correction of abrasion in a robot having a wearing tool mounted thereto according to claim 1, wherein the wearing tool is a wire brush.

* * * * *